(12) United States Patent  
Tang et al.

(10) Patent No.: US 11,800,108 B2
(45) Date of Patent: Oct. 24, 2023

(54) METHOD FOR IMAGE COMPRESSION AND CIRCUIT SYSTEM THEREOF

(71) Applicant: REALTEK SEMICONDUCTOR CORP., Hsinchu (TW)

(72) Inventors: Wan-Ju Tang, Hsinchu (TW); Tsung-Hsuan Li, Hsinchu (TW); Shih-Tse Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/695,953

(22) Filed: Mar. 16, 2022

(65) Prior Publication Data

US 2022/0303539 A1 Sep. 22, 2022

(30) Foreign Application Priority Data

Mar. 19, 2021 (TW) .................. 110109896

(51) Int. Cl.
*H04N 19/124* (2014.01)
*H04N 19/13* (2014.01)
(Continued)

(52) U.S. Cl.
CPC ........... *H04N 19/124* (2014.11); *G06F 7/588* (2013.01); *H04N 19/13* (2014.11); *H04N 19/176* (2014.11); *H04N 19/186* (2014.11)

(58) Field of Classification Search
CPC .... H04N 19/124; H04N 19/13; H04N 19/186; H04N 19/588
See application file for complete search history.

(56) References Cited

U.S. PATENT DOCUMENTS

2001/0041017 A1* 11/2001 De Queiroz ............ G06T 9/008
382/253
2009/0028448 A1* 1/2009 Collomosse ...... H03M 13/2717
382/232
(Continued)

FOREIGN PATENT DOCUMENTS

| TW | 201112764 A | 4/2011 |
| TW | 201327416 A | 7/2013 |
| TW | 201709733 A | 3/2017 |

*Primary Examiner* — Zhubing Ren
(74) *Attorney, Agent, or Firm* — Li & Cai Intellectual Property (USA) Office

(57) ABSTRACT

A method for image compression and a circuit system thereof are provided. In the method, pixel values of an image are obtained. A compression scenario is decided, for example, a uniform-quantization manner or a non-uniform-quantization manner is used for an M-bit image being compressed to an N-bit image so as to decide codeword sections for the image. Every codeword section has a codeword distance. The codeword sections have a fixed codeword distance in the uniform-quantization manner. Alternatively, in the non-uniform-quantization manner, the image can be divided into multiple codeword sections having different codeword distances according to a brightness distribution. Afterwards, a random number is generated for deciding codeword and index for original value of each of the pixels. An index table is accordingly formed. The index table is provided for obtaining the codeword in a decoding process by querying a codebook with the index.

12 Claims, 4 Drawing Sheets

(51) Int. Cl.
*G06F 7/58* (2006.01)
*H04N 19/186* (2014.01)
*H04N 19/176* (2014.01)

(56) References Cited

U.S. PATENT DOCUMENTS

2009/0046935 A1* 2/2009 Akenine-Moller ....... G06T 9/00
                                                        382/235
2019/0121884 A1* 4/2019 Swaminathan ......... H03M 7/30

* cited by examiner

METHOD FOR IMAGE COMPRESSION AND CIRCUIT SYSTEM THEREOF

CROSS-REFERENCE TO RELATED PATENT APPLICATION

This application claims the benefit of priority to Taiwan Patent Application No. 110109896, filed on Mar. 19, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to a method for image compression, and more particularly to a method for image compression for a video with a fixed-length code based on random and non-uniform quantization and a circuit system thereof.

BACKGROUND OF THE DISCLOSURE

In recent years, with the widespread use of image-taking apparatus, it is easier to acquire image data. Further, the image processing capability is getting powerful with the hardware upgrades and people can obtain images that have better quality easily. However, a file size of the image becomes larger and requires more space to store the image, and some specific technologies may also increase the requirement of storage space. For example, multiple images having different exposure ranges can be combined into a single high-dynamic-range (HDR) image that requires more storage space. Further, a three-dimensional noise reduction (3DNR) technology achieves a better effect of noise reduction than a single-image noise reduction technology since 3DNR is implemented by using several successive frames of a video, but 3DNR also requires more storage space. Therefore, for obtaining better quality images, the conventional technologies increase cost of the storage space and loading for data transmission and calculation. Therefore, on the premises of preventing too much distortion in the process of data compression and keeping the important information therein, it is an important issue to provide a more efficient data compression method.

In the conventional method for compressing an image or a video, JPEG (Joint Photographic Experts Group) format is a widespread image compression standard. JPEG format uses a variable length coding (VLC) method. VLC is usually a good method for image compression, but it is difficult to estimate the maximum bandwidth for transmission due to the characteristics of a variable length, and uncertainties for designing a related system are increased. Further, VLC may increase amount of data under some extreme cases.

To solve the deficiency of JPEG, conventional image compression technology such as texture compression is provided. The texture compression can provide a better compression efficiency since it is a vector quantization manner that can reduce the size of a codebook made of code vectors based on a distribution of pixel values of the image, e.g., a color line model. The texture compression is a kind of nearly-lossless compression, which may compromise the performance of some image processing algorithms. For example, when 3DNR averages the multiple compressed images for reducing random noises, 3DNR cannot fix the distortion due to the image compression, and fails to effectively maintain the advantages of 3DNR to keep static texture details, and needs to overcome error propagation caused by repeated compressions.

Even if distortion is not present in the nearly-lossless compression, the nearly-lossless compression does not apply to the image or video processing process such as 3DNR since the nearly-lossless compression has a similar issue with the variable length coding method.

SUMMARY OF THE DISCLOSURE

Even though the conventional methods can achieve effective image compression, they still meet the problems such as most of the methods are kinds of nearly-lossless compression, or due to the variable length coding technology, it is difficult for the conventional methods to estimate the maximum bandwidth for transmission or uncertainties of system design is increased even if the conventional methods can achieve nearly-lossless compression. In response to the above-referenced technical inadequacies, the present disclosure provides a method for image compression and a circuit system. The method particularly adopts a technology for video coding with fixed-length code based on random and non-uniform quantization that can reduce a negative impact of the compression process on the image or the video.

In one embodiment of the present disclosure, the method for image compression is applied to a circuit system. The circuit system is such as an image-processing circuit disposed in a camera or a camcorder. The image-processing circuit performs the method for image compression. The method starts from a step of receiving an image and obtaining pixel values of the image via a circuit, in which each of the pixels has an original value.

A compression scenario is firstly decided. The compression scenario denotes a scenario that utilizes a uniform-quantization manner or a non-uniform-quantization manner to encode the image from M-bit image data to N-bit image data, and also decide one or more codeword sections. Each of the codeword sections has a codeword distance. In the method, a random number generator is used to generate a random number that is referred to for deciding a codeword and an index of an original value of each of the pixels. After the codeword and the index of the original value of the pixel in the method are decided, an index table is formed. The index table records every original value and the corresponding codeword so as to form a query index for achieving a purpose of querying a codebook and reproducing the image.

Preferably, in the uniform-quantization manner, since the uniform-quantization manner adopts a fixed codeword distance in every codeword section, the pixels of the image are divided into multiple sections with the same codeword distance based on configuration of the codeword section.

In one further embodiment of the disclosure, the non-uniform-quantization manner is used in image compression based on the characteristics that a human eye has different sensitivities to a bright portion and a dark portion of the image. The image can be divided into multiple brightness sections according to a brightness distribution of the image. The multiple brightness sections are assigned with respective codeword sections according to brightness characteristics of each of the brightness sections. The pixels of the image can be divided into multiple blocks with different codeword distances according to the codeword sections.

Further, in the non-uniform-quantization manner, a normal brightness section of the image is configured to have a normal codeword distance, a lower brightness section of the image is configured to have a smaller codeword distance, and a higher brightness section is configured to have a larger codeword distance.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
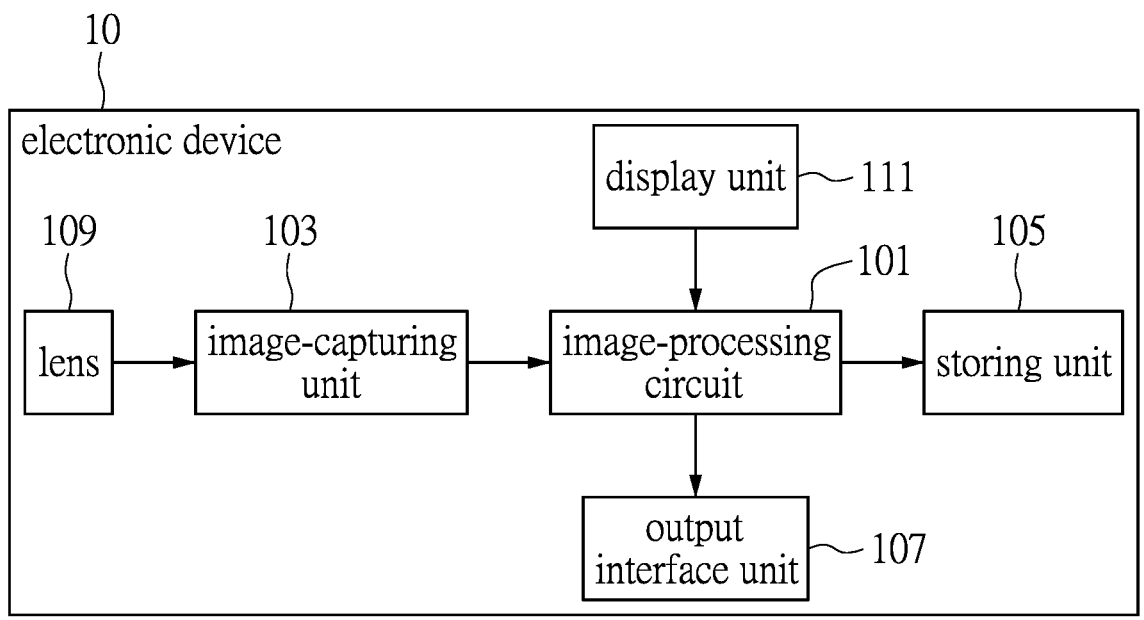
FIG. 1 is a schematic block diagram depicting a circuit system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a method for image compression and a circuit system that implements the method. It is characterized in that the method incorporates a fixed-length coding technology for achieving a nearly lossless compression with a certain level of compression rate, or achieving the effect of nearly lossless compression under some certain conditions. In other words, after an image is compressed by the method for image compression of the present disclosure, human eyes may not be aware of the loss when watching a series of successive frames formed by the decompressed images.

The characteristics of the method for image compression of the present disclosure are described as follows. The method for image compression can be applied to a circuit system provided in an electronic device. The electronic device is such as a camera, a webcam or a device that is capable of capturing images or requires image compression. In an exemplary example, the electronic device includes an image-processing chip that is used to perform the method for image compression on an image or a video captured by the electronic device. The method provides an unbiased and nearly lossless compression for the human eyes with a need of fixed-length code.

Reference is made to FIG. 1, which is a circuit block diagram depicting main circuits of the circuit system in an electronic device 10 according to one embodiment of the present disclosure.

The circuit system includes an image-processing circuit 101 disposed in the electronic device 10. The image-processing circuit 101 is such as a digital signal processor (DSP), a microprocessor or a specific kind of processor. The image-processing circuit 101 is generally an integrated circuit that is capable of image processing. The electronic device 10 includes an image-capturing unit 103 that is such as a photo sensor, which can be implemented by a CCD (charge-coupled device) or a CMOS (complementary metal oxide semiconductor). The image-capturing unit 103 senses external lights through a lens 109 and forms an image data. The electronic device 10 includes a storing unit 105 that implements a flash-based storage device. The storing unit 105 is used to store the image data processed by the image-capturing unit 103. The image-capturing unit 103 is configured to restore or compress an image. The electronic device 10 includes an output interface unit 107 that can connect with an external host for transmitting the image data to the host via a wired connection or a wireless connection.

The image-capturing unit 103 receives and senses lights via the lens 109 to form the image data. The image data of each of the pixels is retrieved by the image-processing circuit 101. The image data is compressed by the method for image compression of the present disclosure. The method can be implemented by a firmware or software executed in the circuit system. The image data being compressed and coded is stored to the storing unit 105. If the electronic device 10 is able to display the image, the image-processing circuit 101 is also in charge of decompressing and restoring the image. The image is then displayed by a display unit 111.

Figure 2:
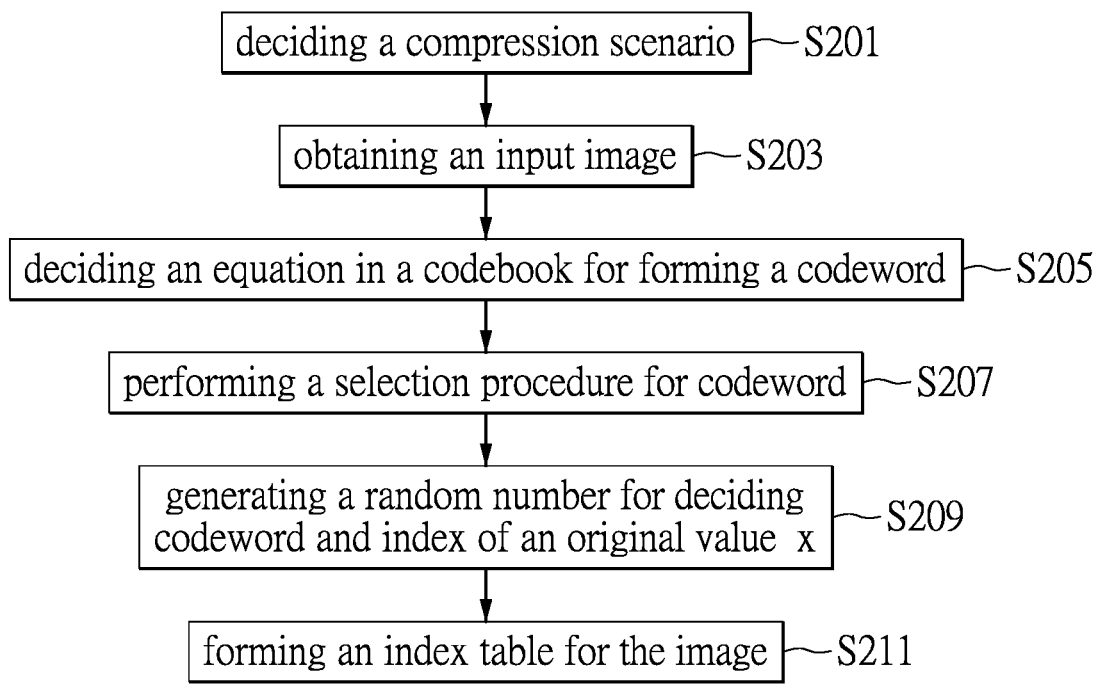
FIG. 2 is a flow chart describing a method for image compression is implemented by a uniform-quantization manner according to one embodiment of the present disclosure.

FIG. 2 is a flow chart describing the method for image compression performed in the image-processing circuit according to one embodiment of the present disclosure.

Before performing the method for image compression, a compression scenario is decided (step S201). The compression scenario includes a compression rate that is applied to an input image. In an exemplary example, an M-bit image data can be encoded to an N-bit image data according to the compression rate. The compression scenario allows the system to adopt a uniform quantization manner or a non-uniform-quantization manner that takes into consideration a dark portion and a bright portion of the input image, so as to decide the parameters such as a codeword section. The codeword section has a codeword distance. The pixels of the image are divided into multiple sections with the same codeword distance based on a configuration of the codeword section.

Next, the circuit system receives an image and obtains a pixel value, i.e., an original value x. The image is firstly stored to a storing unit. The pixel value is a gray value, or indicates a combination of a red-channel value, a green-channel value and a blue-channel value in a red-green-blue (RGB) color space. The image received by the circuit system can be a series of successive frames that are temporarily stored in a buffer of the circuit system. In the circuit system, a noise-reduction technology such as three-dimensional noise reduction (3DNR) is performed (step S203). According to the compression scenario, i.e., the approach to encode the M-bit image data to the N-bit image data, a codeword is generated. Rather than the conventional codeword that represents the value being encoded from the original value by a round-off operation, the method for image compression of the present disclosure chooses the codeword randomly based on a random number generated by a random number generator in accordance with the compression scenario.

In the process, an equation for forming a codeword in a codebook is firstly decided (step S205). The uniform-quantization manner is utilized to perform compression coding, and each of the codeword sections adopts a fixed codeword distance. With encoding the M-bit image data to N-bit image data as an example, an M-bit codeword (i.e., "$c_i$" in Equation 1) and an N-bit index (i.e., "i" in Equation 1) corresponding to the original value of each of the pixels of the image are decided according to the random number. The codebook (C) is described in Equation 1. The codeword (c) satisfies with a relational expression as described by Equation 2. The numeral "n" is a total number of the codewords of the N-bit image data. The numeral "i" indicates the index of the codeword in the N-bit image data, and "i" is ranged from 0 to n−1.

$$C=\{c_i|0 \leq i < n\}, n=2^N \quad \text{(Equation 1)}$$

$$0 \leq c_0 < \ldots < c_{n-1} < 2^M \quad \text{(Equation 2)}$$

Next, with respect to an original value x, a selection procedure for a codeword is performed (step S207) as following procedure, in which "$c_0$" is the smallest codeword and the codewords of any other pixel values smaller than the original value are coded as "$c_0$", and "$c_{n-1}$" is the greatest codeword and the codewords of any other pixel values greater than the original value are coded as "$c_{n-1}$."

Discriminant (1): the codeword is coded as "$c_0$" if x<$c_0$.

Discriminant (2): the codeword is coded as "$c_{n-1}$" if $c_{n-1}$<x.

Discriminant (3): if 0<k<n−1, the codeword satisfies an expression "$c_k \leq x < c_{k+1}$", in which the numeral "k" is an index of the image data to be processed currently.

At this time, a codeword of the original value x is decided. Specifically, the codeword and an index of the original value x can be decided according to a random number generated by a random number generator (step S209). The codeword can be decided by the discriminant equations (4) and (5).

Discriminant (4): "$c_{k+1}$" is chosen with a probability of $$\text{``} \frac{x - c_k}{c_{k+1} - c_k} \text{''}.$$

Discriminant (5): "$c_k$" is chosen with a probability of $$\text{``} \frac{c_{k+1} - x}{c_{k+1} - c_k} \text{''}.$$

A random number r is generated by a random number generator. The random number r satisfies a relation of "$0 \leq r < (c_{k+1} - c_k)$". The discriminants for choosing the codewords "$c_{k+1}$" and "$c_k$" with respect to the original value x are as follows.

Discriminant (6): "$c_{k+1}$" is chosen if the random number satisfies a relation of "r<(x−$c_k$)."

Discriminant (7): "$c_k$" is chosen if the random number satisfies a relation of "(x−$c_k$)≤r."

After the codeword "c" and the index ("k+1" or "k") of the original value in the image are decided, an index table is formed. The index table is used to query the codebook for obtaining the codeword according to the index in a decoding process (step S211). The codebook records a query index between the original pixel values and codewords. For reproducing the image, the query index is provided for querying the codebook conventionally.

With a 8-bit image data being downgraded to a 6-bit image data through a compression process as an example, in an original 8-bit image in an RGB color space, each of the pixels of a color image has an R (red) value, a G (green) value and a B (blue) value that are ranged from 0 to 255. Accordingly, an 8-bit pixel is able to reveal 256-level of brightness.

When an 8-bit image data is downgraded, i.e., downgraded through the image compression process, to a 6-bit image data that is such as a sampling process with a base of "4." The sampling process for deciding the codewords are such as "0*4, 1*4, . . . 63*4." In another aspect, an 8-bit image data being coded to a 5-bit image data is similar with a sampling process with a base of "8." An original value of the 8-bit image data (e.g., a frame of a video) is set to "x." A goal of the coding process is such as the 6-bit image data, and the original value x satisfies a relation such as Equation 3. The numerals "c" or "c+1" are used to decide the codewords for the original value x. The numeral "4" can be changed in accordance with the compression scenario. For example, if the 8-bit image data is compressed to a 5-bit image data, the numeral is changed to the base of "8" that is the decimal numeral "$2^3$."

$$c \cdot 4 \leq x < (c+1) \cdot 4 \quad \text{(Equation 3)}.$$

The method for image compression of the present disclosure adopts a random number generator to generate a random number. In an exemplary example, the random numbers 0 to 3 can be generated uniformly and randomly. The codewords corresponding to the original values are "c" or "c+1." With the 6-bit image data as an example, the numeral "c" is ranged from 0 to 63.

Next, in an aspect, the codeword corresponding to the original value x can be chosen according to the probabilities recited in Equation 4 and Equation 5.

"(c+1)·4" is chosen with a probability of $$\text{``} \frac{x - c \cdot 4}{4} \text{''}. \quad \text{(Equation 4)}$$

"c·4" is chosen with a probability of $$"\frac{(c+1)\cdot 4 - x}{4}".$$ (Equation 5)

In view of the above example, with an 8-bit image data downgraded, i.e., through a compression process, to a 6-bit image data as an example, if M=8 and N=6, the codeword can be expressed by "$c_i$=i·4." The numeral "i" is an index that satisfies a relation "0≤i<n and n=$2^N$=64." With an original value x=65 as an example, a relation for deciding the codeword is "64=$c_{16}$≤x<$c_{17}$=68." Therefore, the codeword of the original value x can be chosen as "$c_{16}$" or "$c_{17}$." A random number is generated by a uniform random number generator, and a relation is "0≤r<$c_{17}$−$c_{16}$=4." A relation can be expressed by "x−$c_{16}$=65−64=1" if the random number is "r=1." In the meantime, a relation is "x−$c_{16}$≤r" and the codeword is "$c_{17}$."

The above-mentioned method for image compression adopts a uniform quantization to decide the codeword. Further, if considering a condition that the human eyes are more sensitive to the dark portion of the image but less sensitive to the bright portion of the image, the non-uniform quantization can be used for deciding the codewords with respect to the brightness sections according to a bright-dark distribution of the image. In one embodiment of the method for image compression, in the image compression process, the pixel values with the original value x of the image can be divided into several brightness sections, and each of the brightness sections has different codeword differences. The non-uniform-quantization manner is then performed based on the difference between the sensitivities of the human eyes with respect to the dark portion and the bright portion. It should be noted that the bright portion of the image has a higher original pixel value, and the dark portion of the image has a lower original pixel value.

The non-uniform-quantization manner is used to divide the image into two or more brightness sections according to a brightness distribution of the pixels in the image. The two or more brightness sections are assigned to respective codeword sections according to brightness characteristics of each of the brightness sections. Thus, the pixels of the image are divided into multiple blocks with different codeword distances according to the two or more codeword sections.

Figure 3:
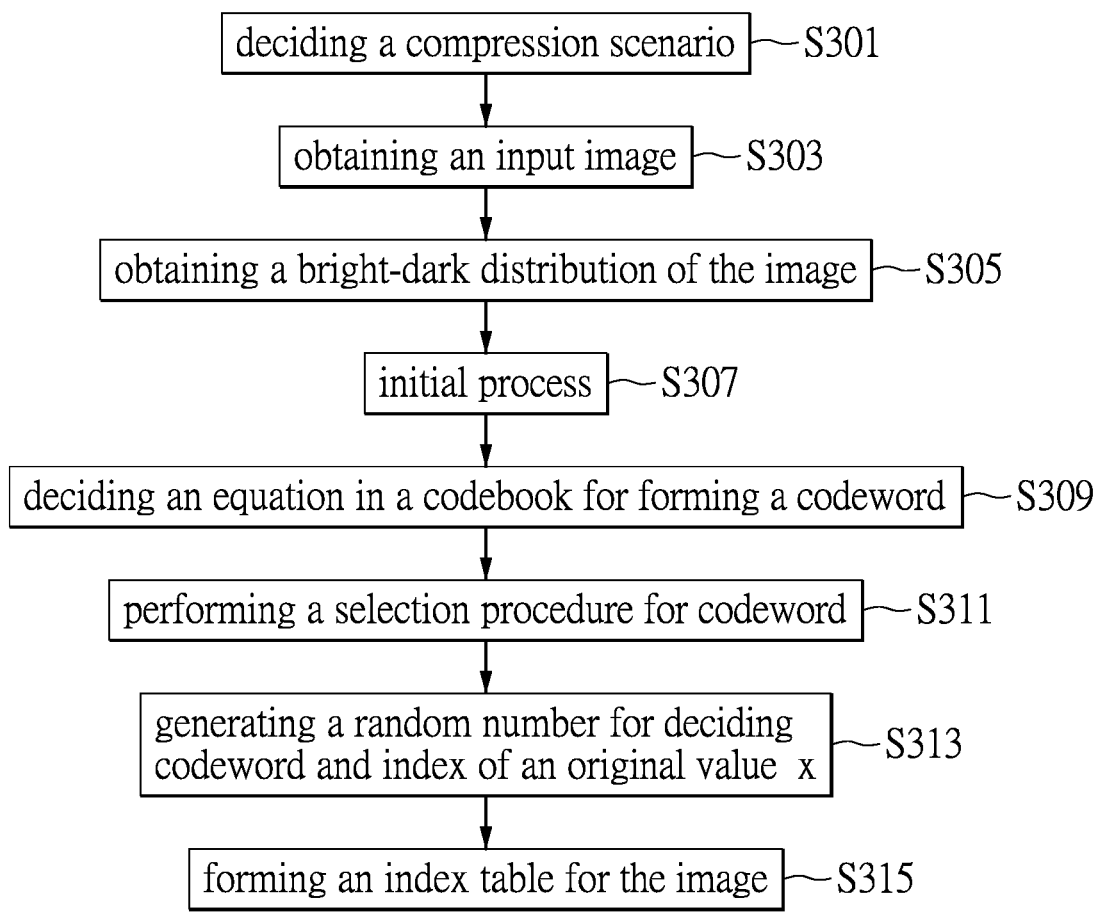
FIG. 3 is another flow chart describing the method for image compression that utilizes a non-uniform-quantization manner to decide a codeword according to one embodiment of the present disclosure.

Reference is made to FIG. 3, which is a flow chart describing the method for image compression with codewords that are decided by the non-uniform-quantization manner according to one embodiment of the present disclosure.

Figure 4:
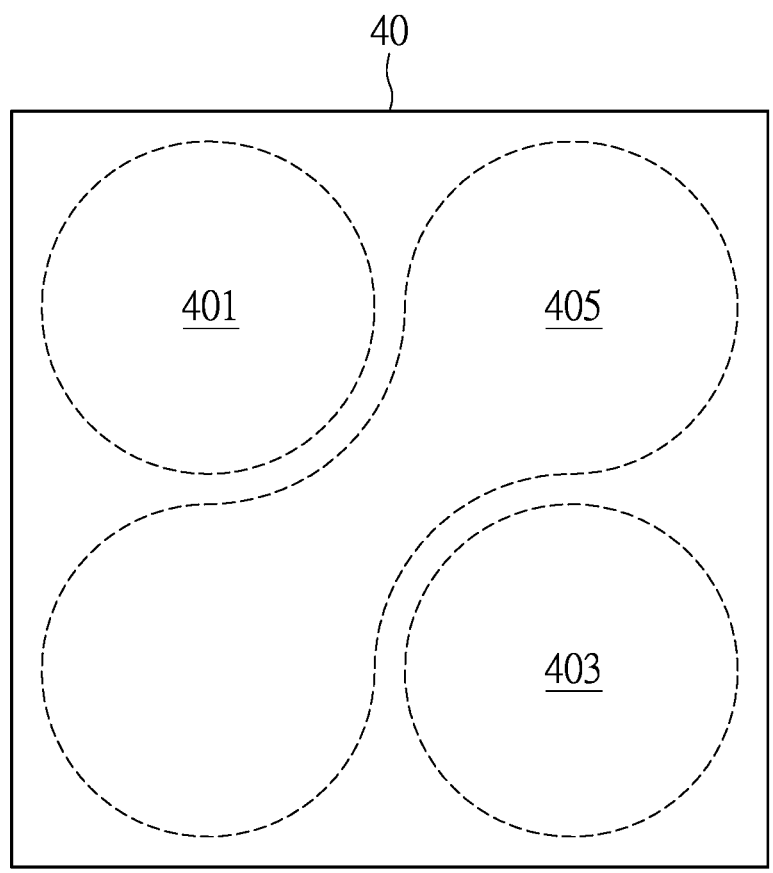
FIG. 4 is a schematic diagram depicting multiple sections having different brightness within a picture in one embodiment of the present disclosure.

Reference is also made to FIG. 4, which is a schematic diagram depicting that an image 40 (e.g., one of a series of successive frames) can be divided into several brightness sections based on a brightness distribution. The brightness sections of the image 40 can be classified into a higher brightness section 401, a lower brightness section 403 and a normal brightness section 405.

In the process, a compression scenario is confirmed in the beginning, e.g., an 8-bit image is compressed to a 6-bit image or an image having other formats (step S301). Next, an input image is obtained (step S303). The image-processing circuit then obtains pixel values of the input image, and also a bright-dark distribution rendered from the pixel values (step S305). Reference is made to FIG. 4, which schematically shows a distribution graph including several brightness sections. Afterwards, the non-uniform-quantization manner decides the codewords used for image compression. However, some initial procedures can be performed before the codewords are decided (step S307).

In an initial procedure, a random quantization manner, i.e., the non-uniform-quantization manner is used due to the uneven bright-dark distribution. In the non-uniform-quantization manner, multiple codeword sections can be decided according to the information of the image. The codeword sections are configured to have different codeword differences according to the brightness characteristics in each codeword section. For example, a section (e.g., the normal brightness section 405) having normal brightness is configured to have a normal codeword distance. A darker section of the image (e.g., the lower brightness section 403 of FIG. 4) is configured to have the smaller codeword distance. A brighter section in the image (e.g., the higher brightness section 401 of FIG. 4) is configured to have the larger codeword distance. Thus, the sections are configured to have the different codeword distances based on the bright-dark distribution of the image. It should be noted that the above-mentioned normal, brighter or darker section and the corresponding codeword distances can be set without an absolute setting rule and based on a practical requirement. The section with the smaller codeword distance (e.g., the darker section) can have a smaller compression rate, i.e., has a better quality, since the human eyes are more sensitive to the section in the image. On the contrary, the other section with the larger codeword distance can be provided with a larger compression rate, i.e., poor quality portion, since the human eyes are less sensitive to the section.

According to the settings in the above-mentioned initial procedure, the image is divided into multiple sections with different codeword distances according to the bright-dark distribution with respect to the pixels or sections (e.g., an average brightness in the sections). In one further embodiment of the present disclosure, the pixels of the image can be resorted according to brightness of each of the pixels, and then the sections assigned to the pixels can be determined for facilitating the subsequent calculation.

After the initial procedure, the equations, i.e., Equation 1 and Equation 2 in conjunction with the discriminants (1) to (7) for forming the codewords in the codebook can be affirmed according to the settings (step S309). Similarly, for every codeword section, a random number is used to decide the codeword with respect to the original value of every pixel. In the equations, numeral "c" is the codeword and the numeral "n" is a total number of the codewords in every codeword section. Since "$c_0$" is the smallest codeword, the original value with the codeword smaller than the smallest codeword is coded to "$c_0$." Since "$c_{n-1}$" is the largest codeword, the original value with the codeword larger than the largest codeword is coded to "$c_{n-1}$." Numeral "k" is an index of the image data which is processed currently, and numeral "x" is the original value. A selection procedure for selecting the codeword according to the original value of every pixel is then initiated (step S311). The random number generated is used to decide the codeword and the index of the original value x (step S313). An index table with respect to the image is established, and the index table is used in a decoding process for obtaining the codewords by querying a codebook according to the indexes (step S315).

After the codewords are chosen, variances among the brightness sections of the image or the frames of a video become small when the image or the video are processed by the compression process with the random and non-uniform-quantization manner. A nearly lossless compression process is achieved since an average of the pixel values still equal to x and it means that an expectation value of quantization error is "0".

With an 8-bit image being compressed to a 6-bit image as an example, the pixel value of each of the pixels of the 8-bit image has a range from 0 to 255 and the pixel value of each of the pixels of the 6-bit image has a range from 0 to 63. For example, a section is configured to have an original pixel value x which is between 0 and 63, and a codeword distance which is set to "2" with a random number from 0 to 1. The section is such as the lower brightness section 403 shown in FIG. 4. Another section is configured to have an original pixel value x which is between 64 and 127, and a codeword distance which is set to "4" with a random number from 0 to 3. The another section is such as the normal brightness section 405 shown in FIG. 4. One further section is configured to have an original pixel value x which is between 128 and 255, and a codeword distance which is set to "8" with a random number from 0 to 7. The one further section is such as the higher brightness section 401 of FIG. 4.

If the original pixel value x is between 0 and 63 and can be expressed by "c·2≤x<(c+1)·2", the codeword can be chosen based on the probabilities recited in Equation 6 and Equation 7.

"(c+1)·2" is chosen with a probability of $$"\frac{x - c \cdot 2}{2}". \quad \text{(Equation 6)}$$

"c·2" is chosen with a probability of $$"\frac{(c+1) \cdot 2 - x}{2}". \quad \text{(Equation 7)}$$

If the original pixel value x is between 64 and 127 and can be expressed by "c·4≤x<(c+1)·4", the codeword can be chosen based on the probabilities recited in Equation 8 and Equation 9.

"(c+1)·4" is chosen with a probability of $$"\frac{x - c \cdot 4}{4}". \quad \text{(Equation 8)}$$

"c·4" is chosen with a probability of $$"\frac{(c+1) \cdot 4 - x}{4}". \quad \text{(Equation 9)}$$

If the original pixel value x is between 128 and 255 and can be expressed by "c·8≤x<(c+1)·8", the codeword can be chosen based on the probabilities recited in Equation 10 and Equation 11.

"(c+1)·8" is chosen with a probability of $$"\frac{x - c \cdot 8}{8}". \quad \text{(Equation 10)}$$

"c·8" is chosen with a probability of $$"\frac{(c+1) \cdot 8 - x}{8}". \quad \text{(Equation 11)}$$

Finally, the codeword and the index with respect to every brightness section are obtained and an index table is accordingly formed.

In summation, according to the above embodiments of the method for image compression, the method is a fixed-length coding technology performed on an image or a video based on random and non-uniform-quantization manner. The method is advantageous in designing a circuit system with an explicit reference since the circuit system is able to determine a bandwidth for transmission. For example, the method allows a manufacturer to design an image-processing circuit for various requirements of different products. Further, the method achieves an unbiased and nearly lossless compression and also reduces the negative impact on the image when the image undergoes the compression process. For reducing distortion in the compression process, the method adopts the non-uniform-quantization process for it considers the sensitivities of human eyes to the bright portion and the dark portion of the image. Therefore, the method is applicable to products that require images of larger size and higher quality, and high-speed performance when the method achieves nearly lossless compression with an increasing number of the successive images. Further, the method provides the nearly lossless compression with a good compression rate, and the method also meets the requirements of implementing noise reduction, e.g., 3DNR, producing large amount of images, and using less storage space.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for image compression, comprising:
   obtaining pixel values of an image, each of pixels of the image has an original value;
   deciding a codeword section having a codeword distance according to a compression scenario, wherein the compression scenario denotes a scenario that utilizes a uniform-quantization manner or a non-uniform-quantization manner to decode the image from M-bit image data to N-bit image data;
   generating a random number by a random number generator and deciding a range of the random number according to the codeword section;
   deciding a codeword and an index of the original value of each of the pixels according to the random number; and
   forming an index table after the codeword and the index of the original value of each of the pixels is decided, wherein the index table records a query index with respect to the original value of each of the pixels and the corresponding codeword for achieving a purpose of querying a codebook and reproducing the image;

wherein the uniform-quantization manner adopts a fixed codeword distance in every codeword section, and the pixels of the image are divided into multiple sections with the same codeword distance based on configuration of the codeword section; and, in the non-uniform-quantization manner, the image is divided into multiple brightness sections according to a brightness distribution of the pixels of the image; wherein each of the brightness sections is configured to have a respective codeword section according to brightness characteristics of the brightness section, and the pixels of the image are divided into multiple blocks with different codeword distances based on the respective codeword sections.

2. The method according to claim 1, wherein the codebook (C) is described by "C={$c_i$|0≤i<n}, and n=$2^N$", wherein numeral "c" is the codeword and satisfies an expression "0≤$c_0$< . . . <$c_{n-1}$<$2^M$"; numeral "n" is a total number of the codewords of N-bit image data; numeral "i" is the index of each of the codewords of the N-Bit image data and has a range from 0 to n−1; "$c_0$" is the smallest codeword and the codewords of any other pixel values smaller than the original value are coded as "$c_0$", and "$c_{n-1}$" is the greatest codeword and the codewords of any other pixel values greater than the original value are coded as "$c_{n-1}$."

3. The method according to claim 2, wherein the step for deciding the codeword of the original value of each of the pixels according to the random number includes discriminant expressions as follows, in which numeral "k" is the index of the image data to be processed currently and numeral "x" is the original value:

the codeword is coded as "$c_0$" if x<$c_0$;
the codeword is coded as "$c_{n-1}$" if $c_{n-1}$<x;
wherein, if 0≤k<n−1, $c_k$<x<$c_{k+1}$ is satisfied, the codeword of the original value x is decided according to a random number r generated by the random number generator, wherein:

"$c_{k+1}$" is selected with a probability of $$"\frac{x - c_k}{c_{k+1} - c_k}";$$

and
"$c_k$" is selected with a probability of $$"\frac{c_{k+1} - x}{c_{k+1} - c_k}";$$

wherein the random number r generated by the random number generator satisfies 0≤r<($c_{k+1}$−$c_k$), and a discriminant expression for selecting the codeword "$c_{k+1}$" or "$c_k$" with respect to the original value x is as follows:
"$c_{k+1}$" is selected if r<(x−$c_k$); and
"$c_k$" is selected if (x−$c_k$)≤r.

4. The method according to claim 1, wherein, in the non-uniform-quantization manner, a normal brightness section of the image is configured to have a normal codeword distance, a lower brightness section of the image is configured to have a smaller codeword distance, and a higher brightness section is configured to have a larger codeword distance.

5. The method according to claim 4, wherein, with respect to each of the codeword sections, the step for deciding the codeword of the original value of each of the pixels according to the random number includes following discriminant expressions, wherein numeral "c" is the codeword, numeral "n" is a total number of the codewords in the codeword section, "$c_0$" is the smallest codeword and the codewords of any other pixel values smaller than the original value are coded as "$c_0$", and "$c_{n-1}$" is the greatest codeword and the codewords of any other pixel values greater than the original value are coded as "$c_{n-1}$", numeral "k" is the index of the image data to be processed currently, and numeral "x" is the original value:

the codeword is coded as "$c_0$" if x<$c_0$;
the codeword is coded as "$c_{n-1}$" if $c_{n-1}$<x
wherein, if 0≤k<n−1, $c_k$≤x<$c_{k+1}$ is satisfied, the codeword of the original value x is decided according to a random number r generated by the random number generator, wherein:

"$c_{k+1}$" is selected with a probability of $$"\frac{x - c_k}{c_{k+1} - c_k}";$$

and
"$c_k$" is selected with a probability of $$"\frac{c_{k+1} - x}{c_{k+1} - c_k}";$$

wherein the random number r generated by the random number generator satisfies 0≤r<($c_{k+1}$−$c_k$), and a discriminant expression for selecting the codeword "$c_{k+1}$" or "$c_k$" with respect to the original value x is as follows:
"$c_{k+1}$" is selected if r<(x−$c_k$); and
"$c_k$" is selected if (x−$c_k$)≤r.

6. The method according to claim 1, wherein the pixel value is a gray value, or indicates a combination of a red-channel value, a green-channel value and a blue-channel value in a red-green-blue color space.

7. A circuit system, comprising:
an image-processing circuit disposed in an electronic device for performing a method for image compression, the method comprising:
receiving an image and obtaining pixel values of the image, wherein each of pixels of the image has an original value, and the pixel values of the image are stored in a storage unit;
deciding a codeword section having a codeword distance according to a compression scenario, wherein the compression scenario denotes a scenario that utilizes a uniform-quantization manner or a non-uniform-quantization manner to decode the image from M-bit image data to N-bit image data;
generating a random number by a random number generator and deciding a range of the random number according to the codeword section;
deciding a codeword and an index of the original value of each of the pixels according to the random number; and
forming an index table after the codeword and the index of the original value of each of the pixels is decided, wherein the index table records a query index with respect to the original value of each of the pixels and the corresponding codeword for achieving a purpose of querying a codebook and reproducing the image;

wherein the uniform-quantization manner adopts a fixed codeword distance in every codeword section, and the pixels of the image are divided into multiple sections with the same codeword distance based on configuration of the codeword section; and, in the non-uniform-quantization manner, the image is divided into multiple brightness sections according to a brightness distribution of the pixels of the image; wherein each of the brightness sections is configured to have a respective codeword section according to brightness characteristics of the brightness section, and the pixels of the image are divided into multiple blocks with different codeword distances based on the respective codeword sections.

8. The circuit system according to claim 7, wherein the codebook (C) is described by "C={$c_i$|0≤i<n}, and n=$2^N$", wherein numeral "c" is the codeword and satisfies an expression "0≤$c_0$< . . . <$c_{n-1}$<$2^M$"; numeral "n" is a total number of the codewords of N-bit image data; numeral "i" is the index of each of the codewords of the N-Bit image data and has a range from 0 to n−1; "$c_0$" is the smallest codeword and the codewords of any other pixel values smaller than the original value are coded as "$c_0$", and "$c_{n-1}$" is the greatest codeword and the codewords of any other pixel values greater than the original value are coded as "$c_{n-1}$."

9. The circuit system according to claim 8, wherein the step for deciding the codeword of the original value of each of the pixels according to the random number includes discriminant expressions as follows, in which numeral "k" is the index of the image data to be processed currently and numeral "x" is the original value:

the codeword is coded as "$c_0$" if x<$c_0$;
the codeword is coded as "$c_{n-1}$" if $c_{n-1}$<x
wherein, if 0≤k<n−1, $c_k$≤x<$c_{k+1}$ is satisfied, the codeword of the original value x is decided according to a random number r generated by the random number generator, wherein:

"$c_{k+1}$" is selected with a probability of $$"\frac{x - c_k}{c_{k+1} - c_k}";$$

and
"$c_k$" is selected with a probability of $$"\frac{c_{k+1} - x}{c_{k+1} - c_k}";$$

wherein the random number r generated by the random number generator satisfies 0≤r<($c_{k+1}$−$c_k$), and a discriminant expression for selecting the codeword "$c_{k+1}$" or "$c_k$" with respect to the original value x is as follows:
"$c_{k+1}$" is selected if r<(x−$c_k$); and
"$c_k$" is selected if (x−$c_k$)≤r.

10. The circuit system according to claim 7, wherein, in the non-uniform-quantization manner, a normal brightness section of the image is configured to have a normal codeword distance, a lower brightness section of the image is configured to have a smaller codeword distance, and a higher brightness section is configured to have a larger codeword distance.

11. The circuit system according to claim 10, wherein, with respect to each of the codeword sections, the step for deciding the codeword of the original value of each of the pixels according to the random number includes following discriminant expressions, wherein numeral "c" is the codeword, numeral "n" is a total number of the codewords in the codeword section, "$c_0$" is the smallest codeword and the codewords of any other pixel values smaller than the original value are coded as "$c_0$", and "$c_{n-1}$" is the greatest codeword and the codewords of any other pixel values greater than the original value are coded as "$c_{n-1}$", numeral "k" is the index of the image data to be processed currently, and numeral "x" is the original value:

the codeword is coded as "$c_0$" if x<$c_0$;
the codeword is coded as "$c_{n-1}$" if $c_{n-1}$<x
wherein, if 0≤k<n−1, $c_k$≤x<$c_{k+1}$ is satisfied, the codeword of the original value x is decided according to a random number r generated by the random number generator, wherein:

"$c_{k+1}$" is selected with a probability of $$"\frac{x - c_k}{c_{k+1} - c_k}";$$

and
"$c_k$" is selected with a probability of $$"\frac{c_{k+1} - x}{c_{k+1} - c_k}";$$

wherein the random number r generated by the random number generator satisfies 0≤r<($c_{k+1}$−$c_k$), and a discriminant expression for selecting the codeword "$c_{k+1}$" or "$c_k$" with respect to the original value x is as follows:
"$c_{k+1}$" is selected if r<(x−$c_k$); and
"$c_k$" is selected if (x−$c_k$)≤r.

12. The circuit system according to claim 7, wherein the pixel value is a gray value, or indicates a combination of a red-channel value, a green-channel value and a blue-channel value in a red-green-blue color space.

* * * * *